US008266696B2

(12) United States Patent
O'Rourke et al.

(10) Patent No.: US 8,266,696 B2
(45) Date of Patent: Sep. 11, 2012

(54) TECHNIQUES FOR NETWORK PROTECTION BASED ON SUBSCRIBER-AWARE APPLICATION PROXIES

(75) Inventors: Christopher C. O'Rourke, Apex, NC (US); Frank Gerard Bordonaro, Cary, NC (US); Louis Menditto, Raleigh, NC (US); Robert Batz, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1188 days.

(21) Appl. No.: 11/273,112

(22) Filed: Nov. 14, 2005

(65) Prior Publication Data

US 2007/0113284 A1    May 17, 2007

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/23; 726/25
(58) Field of Classification Search .................. 726/1–3, 726/11–14, 22–23, 24, 25; 705/400
See application file for complete search history.

(56) References Cited

U.S. PATENT DOCUMENTS

| 6,359,880 | B1 * | 3/2002 | Curry et al. .................... 370/352 |
| 6,463,468 | B1 * | 10/2002 | Buch et al. ..................... 709/219 |
| 6,615,358 | B1 | 9/2003 | Dowd et al. |
| 6,751,677 | B1 | 6/2004 | Ilnicki et al. |
| 6,804,783 | B1 | 10/2004 | Wesinger et al. |
| 6,823,378 | B2 | 11/2004 | Ullmann |
| 6,832,321 | B1 | 12/2004 | Barrett |
| 6,925,572 | B1 | 8/2005 | Amit et al. |
| 6,941,474 | B2 | 9/2005 | Boles et al. |
| 7,082,117 | B2 * | 7/2006 | Billhartz ....................... 370/338 |
| 7,224,678 | B2 * | 5/2007 | Billhartz ....................... 370/338 |
| 7,277,963 | B2 * | 10/2007 | Dolson et al. ................. 709/246 |
| 7,296,288 | B1 * | 11/2007 | Hill et al. .......................... 726/2 |

(Continued)

FOREIGN PATENT DOCUMENTS

CN    101390342    3/2009

(Continued)

OTHER PUBLICATIONS

Mariusz Burdach. "Hardening the TCP/IP stack to SYN attacks". Sep. 10, 2003. SecurityFocus HOME Infocus. Available at http://web.archive.org/web/20031207102912/www.securityfocus.com/printable/infocus/1729. Downloaded May 14, 2010.*

(Continued)

*Primary Examiner* — David Garcia Cervetti
(74) *Attorney, Agent, or Firm* — Patent Capital Group (57) ABSTRACT

Techniques for responding to intrusions on a packet switched network include receiving user data at a subscriber-aware gateway server between a network access server and a content server. The user data includes subscriber identifier data that indicates a unique identifier for a particular user, network address data that indicates a network address for a host used by the particular user, NAS data that indicates an identifier for the network access server, flow list data that indicates one or more open data packet flows, and suspicious activity data. The suspicious activity data indicates a value for a property of the open data packet flows that indicates suspicious activity. It is determined whether an intrusion condition is satisfied based on the suspicious activity data. If the intrusion condition is satisfied, then the gateway responds based at least in part on user data other than the network address data.

34 Claims, 5 Drawing Sheets

U.S. PATENT DOCUMENTS

| | | | |
|---|---|---|---|
| 7,313,092 B2* | 12/2007 | Lau et al. | 370/230 |
| 7,433,943 B1* | 10/2008 | Ford | 709/223 |
| 8,032,409 B1* | 10/2011 | Mikurak | 705/14.26 |
| 2004/0193513 A1* | 9/2004 | Pruss et al. | 705/30 |
| 2004/0193892 A1 | 9/2004 | Tamura et al. | |
| 2005/0018618 A1 | 1/2005 | Mualem et al. | |
| 2005/0144467 A1 | 6/2005 | Yamazaki | |
| 2005/0177869 A1 | 8/2005 | Savage et al. | |
| 2006/0026670 A1* | 2/2006 | Potter et al. | 726/7 |
| 2007/0166051 A1* | 7/2007 | Sebayashi et al. | 398/177 |
| 2007/0192846 A1* | 8/2007 | Thai et al. | 726/12 |
| 2008/0276000 A1* | 11/2008 | Motte et al. | 709/233 |
| 2011/0138462 A1* | 6/2011 | Kim et al. | 726/22 |

FOREIGN PATENT DOCUMENTS

| | | |
|---|---|---|
| EP | 1 143 665 A | 10/2001 |
| EP | 1 977 561 | 9/2007 |
| WO | WO 2007/100388 | 9/2007 |

OTHER PUBLICATIONS

European Search Report dated Jul. 10, 2009, for Application No. PCT/US2006/060657, 12 pages.

Cisco: "Providing Service Security with Cisco Service Control Technology," Internet Citation, [online] Feb. 2005, pp. 1-5, XP002531614, Retrieved from the Internet on Jun. 9, 2009: URL:http://www.cisco.com/en/US/prod/collateral/ps7045/ps6129/ps6133/ps6150/prod_brochure 0900aecd8024ffla.pdf , 6 pages.

S. Snapp, et al., "DIDS (Distributed Intrusion Detection System) Motivation, Architecture, and An Early Prototype," Proceedings of the 14th National Computer Security Conference, [Online] Oct. 1991, pp. 167-176, XP002531615, Washington, D.C., Retrieved from the Internet on Jun. 9, 2009: URL:http://citeseer.1st.psu.edu/snapp91dids.html, 10 pages.

Cisco: "Introducing Cisco Service Control—Enabling Profitable Delivery of New IP Services," Internet Publication, [Online] Apr. 5, 2005, pp. 1-3, XP002531616, Retrieved from the Internet on Jun. 9, 2009: URL:http://web.archive.org/web/20050405005625/http://cisco.com/en/US/products/hw/cable/products_promotion0900aecd801cac91.html, 4 pages.

EPO Dec. 23, 2011 Response to Communication mailed Jun. 16, 2011 from EPO Application 06850119.6; 18 pages.

Rigney, C., "Radius Accounting," Network Working Group RFC 2866, Jun. 2000; 30 pages http://www.ietf.org/rfc/rfc2866.txt.

Rigney, C., "Remote Authentication Dial in User Service (RADIUS)," Network Working Group RFC 2865, Jun. 2000;76 pages; http://www.ietf.org/rfc/rfc2866.txt.

PCT Jun. 3, 2008 International Search Report for International Application No. PCT/US06/60657; 1 page.

PCT Jul. 1, 2008 International Preliminary Report on Patentability and Written Opinion for International Application No. PCT/US06/60657; 7 pages.

PRC Jan. 12, 2011 First Office Action for Chinese Patent Application No. 200680042551.8 (published as CN 101390342; 15 pages.

May 24, 2011 Response to PRC First Office Action issued on Jan. 12, 2011 for Chinese Patent Application No. 200680042551.8; 21 pages.

EPO Oct. 15, 2009 Communication Pursuant to Article 94(3)EPC for EPO Application 06850119.6; 1 page.

Feb. 12, 2010 Reply to EPO Communication for EPO Application 06850119.6 (published as EP 1977561); 25 pages.

EPO Jun. 16, 2011 Communication Pursuant to Article 94(3)EPC for EPO Application 06850119.6; 5 pages.

PRC Jul. 29, 2011 Second Office Action for Chinese Patent Application No. 200680042551.8; 16 pages.

Oct. 13, 2011 Response to PRC Second Office Action issued on Jul. 29, 2011 for Chinese Patent Application No. 200680042551.8; 17 pages.

* cited by examiner

TECHNIQUES FOR NETWORK PROTECTION BASED ON SUBSCRIBER-AWARE APPLICATION PROXIES

BACKGROUND OF THE INVENTION

1. Field of the Invention

The present invention relates to protection from attacks and fraud in a communication network with application proxies that are subscriber aware, such as service gateways that regulate application activity; and, in particular, to discerning a user identifier other than network address of a user initiating an attack or fraud in order to end the intrusion, such as a scanning attack that initiates packet flows to a large number of destinations in a short time.

2. Description of the Related Art

Networks of general-purpose computer systems and other devices connected by external communication links are well known. The networks often include one or more network devices that facilitate the passage of information between the computer systems. A network node is a network device or computer system connected by the communication links. As used herein, an end node is a network node that is configured to originate or terminate communications over the network. In contrast, an intermediate network node facilitates the passage of data between end nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, typically higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header, and some combination of a transport (layer 4) header, a session (layer 5) header, a presentation (layer 6) header and an application (layer 7) header as defined by the Open Systems Interconnection (OSI) Reference Model. In networking parlance, a tunnel for data is simply a protocol that encapsulates that data.

Subscribers obtain access to a packet-switched network (PSN) of an Internet Service Provider (ISP) through a Network Access Server (NAS). A subscriber often uses a link-layer protocol to form a temporary tunnel between the subscriber's device and the NAS. The contents of the tunneling protocol payload are not involved in determining the path. The NAS determines whether an entity attempting access is in fact a subscriber authorized to access the network by exchanging packets with an Authentication, Authorization, and Accounting (AAA) server. Example well-known AAA servers include the Remote Authentication Dial In User Service (RADIUS) server, Terminal Access Controller Access Control System (TACACS), and the DIAMETER server. Once the entity is authenticated to be an authorized subscriber, then access is granted to the ISP network, the subscriber is assigned a network layer address, such as an Internet Protocol (IP) address, and internetwork-layer payloads are routed based on the internetwork and higher layer header information.

A modem ISP can offer different services to different subscribers, including services delivered in protocol layers 4 through 7. For example, the rate of data delivery of large Web pages to some subscribers can be increased by compressing the Web pages before delivery and un-compressing the Web pages at a process on the subscriber's own equipment. As is well known in the art, Web pages are transmitted over a network using the Hypertext Transfer Protocol (HTTP), an application-layer (layer 7) protocol. Certain Web pages can be blocked using a Web filtering service. A service that provides some combination of compression, filtering and local caching of Web pages is called Web optimization. Some subscribers use mobile devices, such as cell phones, that have smaller memory and display capacities than other network devices. Web pages are communicated to such mobile devices using special protocols, such as the Wireless Application Protocol (WAP), an application-layer protocol. HTTP payloads are translated to WAP payloads before delivery to these subscribers.

To deliver these special services, service gateways are included in the ISP packet switched networks. Service gateways are processes that operate on intermediate network devices between the source and the destination of data packets. The service gateways inspect packet payloads for the purpose of delivering a network service. Example services include payload translation, just described, and other payload changes, as well as special billing, rating, filtering services and other services that do not modify the contents of a payload. For example, Web compression gateways compress HTTP payloads of data packets directed to a subscriber's device and un-compress HTTP payloads of data packets originating from a subscriber's device. A WAP 1.x gateway converts HTTP payloads of data packets directed to a subscriber's device to WAP 1.x payloads and converts WAP 1.x payloads of data packets originating from a subscriber's device to HTTP payloads. Some ISPs offer different services to different subscribers. These are subscriber-aware services.

To ensure that a service gateway for a service offered by the ISP is included in packet-switched paths from the subscriber to any destination on the network accessed by the ISP network, the service gateway is included as a proxy for an actual destination used to set up a subscriber's session on the network. For example, AAA server traffic for a NAS is directed to a service gateway, which serves as a proxy for the AAA server. A subscriber-aware service gateway monitors the AAA server traffic to determine the remote user's network identifier and whether the remote user has subscribed to the service provided by the gateway. For example, the service gateway monitors RADIUS to determine mapping of subscriber ID to currently assigned network ID; and, in addition, RADIUS is used to relay information on users' subscribed service profile to the network elements from a back-end database, typically behind the RADIUS server.

It is common for an ISP to include a cluster of service gateways so the service can be scaled to the number of subscribers. To distribute traffic among the service gateways in the cluster, a load balancer process is included in the path between the NAS (or other end node) and the cluster of service gateways.

It is also common for an ISP to include a firewall server in the path between the NAS and the service gateway (or its load balancer process). The firewall determines whether data packets are received from an unwanted source or directed to an unwanted destination on the access network and does not forward such data packets. The unwanted sources and destinations are identified by their IP addresses. The IP addresses of unwanted sources and destinations are determined by a policy indicated by policy data at the firewall. The policy may be based on static lists of IP addresses, or dynamically determined IP addresses based on one or more characteristics of a flow of data packets.

A flow of data packets is a series of one or more data packets within a reasonable period of time from the same source process to the same destination process on a network. The source and destination processes are typically identified based on some combination of their layer 3 IP addresses and layer 4 transport ports. Unwanted IP addresses may be defined in any manner, including static lists of one or more IP addresses, and methods for dynamically determining one or more unwanted IP addresses based on characteristics of one or more flows with that IP address. Intermediate network node operating systems, such as the Internetwork Operating System (IOS) of Cisco Systems, San Jose, Calif., define Access Control Lists (ACL) for identifying and filtering unwanted IP addresses.

While suitable for many purposes, there are some deficiencies with the prior approaches that use firewalls to exclude unwanted traffic. One deficiency is that firewalls are sometimes not deployed by customers because the firewalls add to the cost of a network and can diminish the perceived performance. Thus firewalls are sometimes not deployed, leaving the service gateways vulnerable to attacks in application layers 4 through layer 7. For example, in a scan attack, a malicious process running on an end node can initiate traffic to a large number of IP address (layer 3) and port (layer 4) destination combinations on the target network within a short period of time. Resources at the service gateway and beyond are consumed in processing individual transactions within each such flow to engage the correct server for the corresponding subscriber. If a sufficient number of such flows are initiated, the service gateway or its cluster can become so encumbered that legitimate flows are not processed in a timely manner or, in some cases, at all.

Another deficiency is that a firewall alerted to the IP address of such a malicious end node only protects against traffic from that same IP address. The actual subscriber using the device with the unwanted IP address is not identified. Thus if the same subscriber switches the attack to launch from another device with a different IP address, such as by moving with a cell phone to a different point in the access network or to a different access network, the firewall has to rediscover the new unwanted IP address. In the meantime the service gateway and access network have both wasted resources on the data flows from the same malicious subscriber at the new IP address.

Another deficiency is that a firewall alerted to the IP address of such a malicious end node only protects the target network downstream from the firewall. Thus malicious traffic from a user on the access network that is detected by a firewall on the target network protects the target network but not the access network. Considerable access network resources upstream of the firewall are consumed by the attack only to be dropped by the firewall in protecting the target network.

Another disadvantage is that firewalls do not detect fraud. Whereas an attack is typically aimed at openly degrading the performance of equipment of the ISP; fraud is typically aimed at undetectably running non-permitted protocols/application on the network without. The firewall is often unable to determine whether a reasonable amount of traffic represents an unauthorized use of privileged or restricted protocols or applications.

Based on the foregoing description, there is a clear need for protection from attacks and fraud (called hereinafter "intrusions") that consume significant network resources for service gateway processes, which protection does not suffer all the deficiencies of prior art approaches. In particular, there is a need for techniques that detect intrusions in layer 4 through layer 7 protocols and either identifies users of malicious end nodes by name or detaches such malicious end nodes from the access network to free up resources in the access network, or both.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for protecting against intrusions (including either or both fraud and attacks) at a service gateway server. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are illustrated with many examples in the context of a NAS gateway, but the invention is not limited to this context. In other embodiments other service gateways are used to provide protection from network intrusions, such as WAP gateways and other subscriber-aware gateways.

1.0 Network Overview

Figure 1:
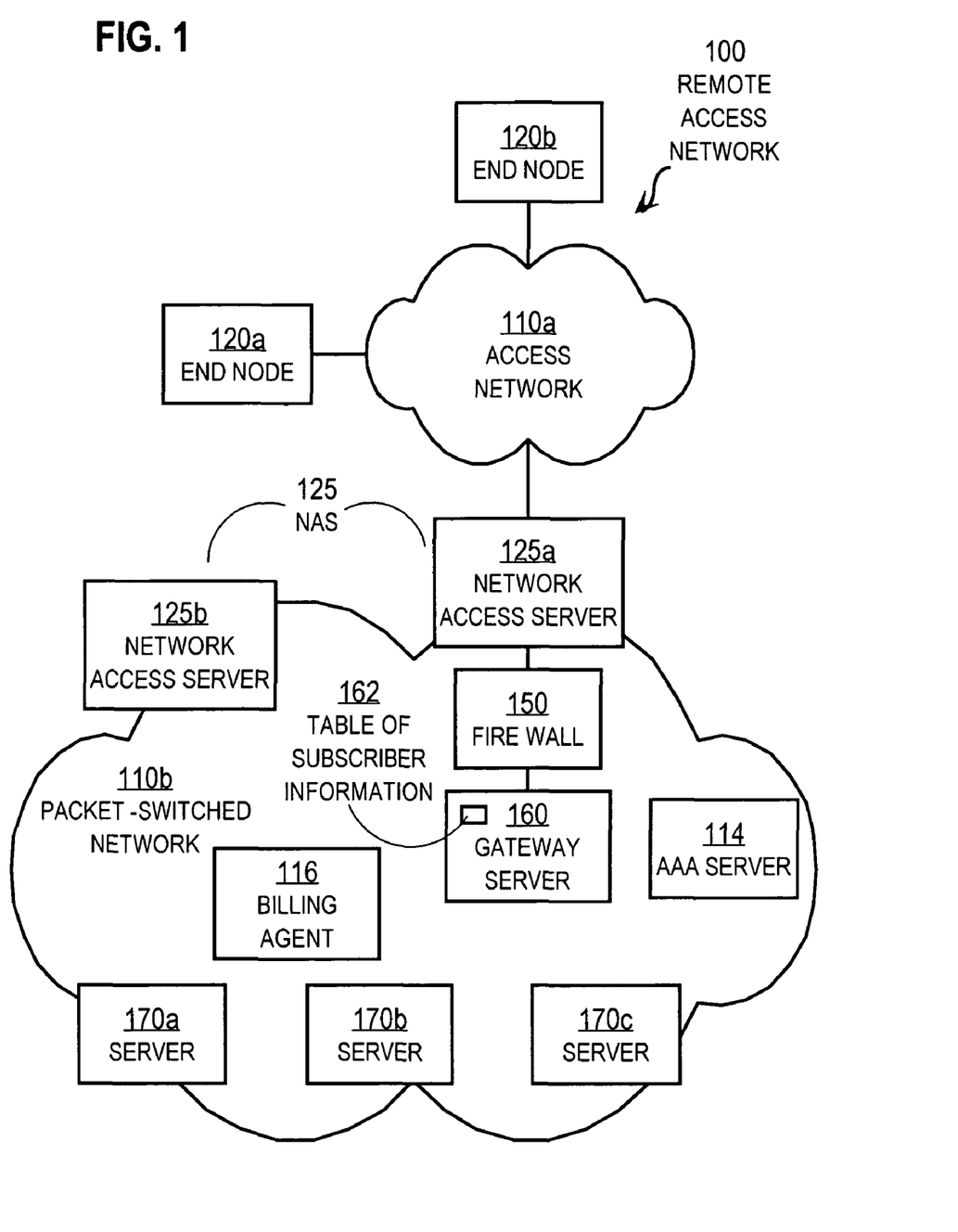
FIG. 1 is a block diagram that illustrates a remote access network that includes a service gateway server, according to an embodiment.

FIG. 1 is a block diagram that illustrates a remote access network 100 that includes network access servers (NAS) 125 and service gateway server 160, according to an embodiment. A computer network is a geographically distributed collection of interconnected sub-networks (e.g., sub-networks 110a, 110b, collectively referenced hereinafter as sub-networks 110) for transporting data between nodes, such as computers, personal data assistants (PDAs) and cell phones. Each sub-network itself may be composed of one or more sub-networks. A local area network (LAN) is an example of a sub-network. The network's topology is defined by an arrangement of end nodes (e.g., end nodes 120a, 120b, collectively referenced hereinafter as end nodes 120) that communicate with one another, typically through one or more intermediate network nodes, such as a router or switch, that facilitates routing data between end nodes 120 on different sub-networks. Two sub-networks 110 that are typically involved in remote access are depicted in FIG. 1. Each sub-network 110 may include zero or more intermediate network nodes. An Internet Protocol (IP) packet-switched network (PSN) 110b is the target for remote access by users of end nodes 120a, 120b at one or more remote sites. The remote sites are connected to the PSN 110b through an access network 110a.

In various embodiments, access sub-network 110a is built, at least in part, on a telephone twisted pair, coaxial copper, optical cable or a wireless infrastructure. In various embodiments, access network 110a includes a controller for a bank of low-bandwidth modems, a digital subscription line (DSL) access module (DSLAM), or other coaxial cable or optical access modules. Although two end nodes 120a, 120b are depicted connected to access network 110a, in other embodiments more or fewer end nodes are connected to access network 110a. For mobile devices, the access network 110a includes circuitry and logic to maintain communication as the mobile device moves from one wireless access point (e.g., a mobile telephone cell antenna) to another.

Communications over sub-network 110a from end nodes 120a, 120b terminate at network access server (NAS) 125a executing on one or more hosts. Other end nodes using other access networks terminate at other NAS, such as NAS 125b on another host or hosts. Although two NASs 125a, 125b are depicted connected to PSN 110b, in other embodiments more or fewer NASs are connected to PSN 110b. In various embodiments the NAS is a Broadband Remote Access Server (BRAS), a wireless access server, or some other server.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer or other communicating devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

PSN 110b is used by end nodes 120a, 120b at a remote site to communicate with servers, such as servers 170a, 170b, 170c (collectively referenced hereinafter as server 170). PSN 110b includes AAA server 114, to authenticate the user of end nodes 120 attempting to access PSN 110b through any NAS 125. Only a subscriber registered with the ISP and listed in the AAA server 114 is given access to PSN 110b. PSN 110b also includes billing agent server 116, to collect information about use of network 110b by a particular subscriber for purposes of obtaining payment from that subscriber. In an illustrated embodiment, billing agent 116 determines when and whether a subscriber is to be listed with the AAA server 114. An example billing agent server is a Billing Mediation Agent (BMA). In some embodiments, the billing agent 116 is omitted and the functions ascribed thereto in the following are distributed among other servers, such as AAA server 114.

To provide special subscriber-aware services, PSN 110b includes service gateway 160. In some embodiments service gateway 160 includes a cluster of multiple service gateways and load balancers (not shown). Although one service gateway 160 is shown in FIG. 1 for purposes of illustration, in other embodiments PSN 110b includes more service gateways 160.

To provide subscriber-aware services, the service gateway 160 is inserted in the path from NAS 125 to AAA server 114, to determine what subscriber is associated with a particular address on network 110b. That is, the service gateway server 160 advertises itself as resolving traffic directed to AAA server 114. The service gateway server 160 snoops through the AAA messages exchanged between the NAS 125 and the AAA server 114, to determine if an IP address is associated with a subscriber for the service provided by the service gateway server 160. The service gateway 160 is also inserted in the path from NAS 125 to another server on network 110b, e.g., in paths to servers 170a, 170b, 170c. For example, all traffic to NAS is routed to service gateway 160.

2.0 Table of Subscriber Information

Figure 2:
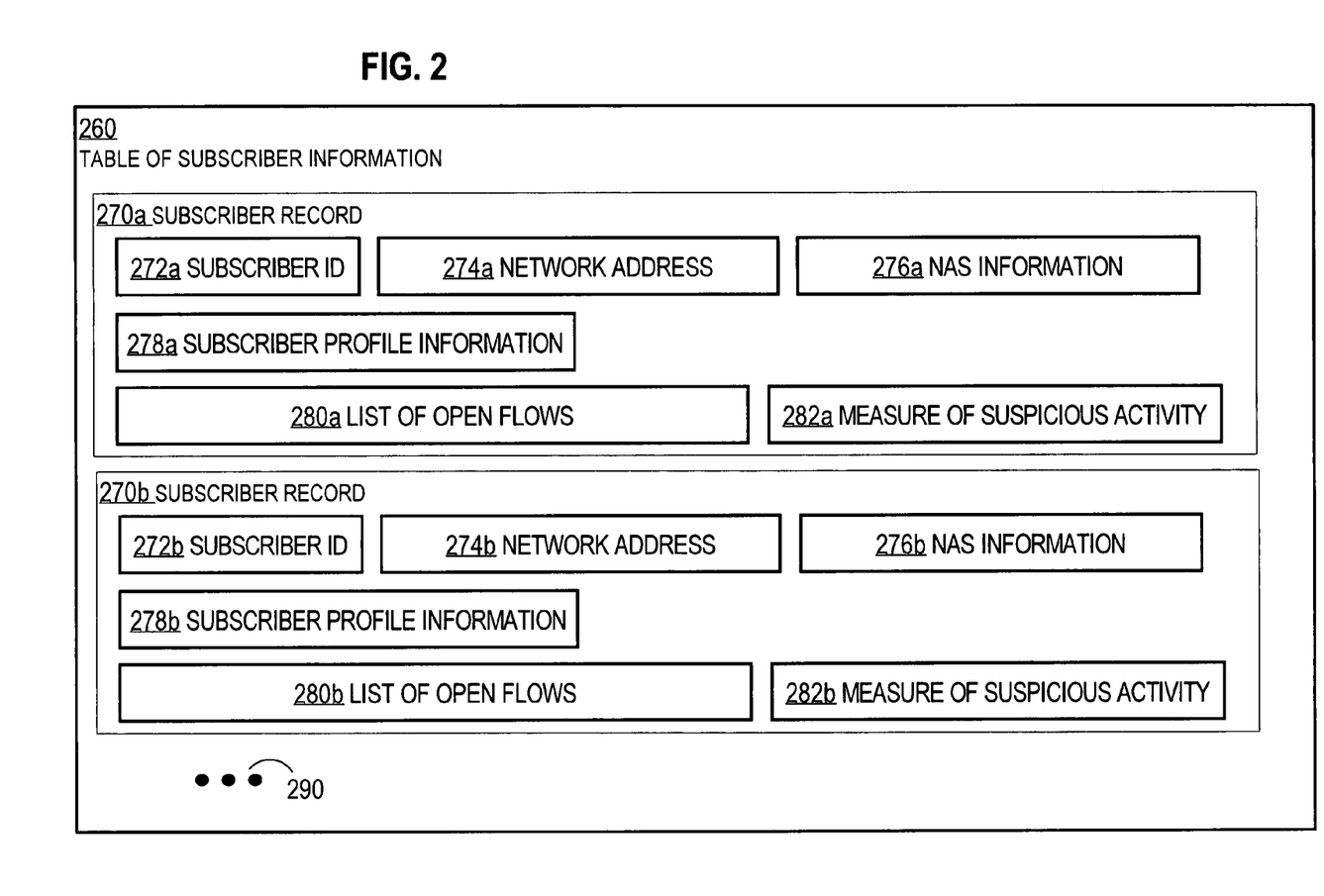
FIG. 2 is a block diagram that illustrates table of subscriber information on a service gateway server, according to an embodiment.

FIG. 2 is a block diagram that illustrates a table of subscriber information on a service gateway server according to an embodiment. Although data fields for holding data in table 260 are displayed in an integral data structure in FIG. 2A for purposes of illustration, in other embodiments, one or more fields or portions of fields are held in any sequence in volatile or non-volatile memory in one or more different data structures in the same or different hosts and controlled by zero or more different data servers, such as one or more database servers.

Table 260 includes subscriber record fields 270a, 270b and others indicated by ellipsis 290 (collectively referenced hereinafter as subscriber records 270). Each subscriber record 270 includes fields for subscriber identifier, network address, network access server (NAS) information, subscriber profile information, a list of open flows, as is typical of current service gateway servers. According to the illustrated embodiments of the invention, Table 260 also includes a measure of suspicious activity based on the open flows, as described in more detail below. These subscriber records associate a particular subscriber with suspicious activity in one or more open data flows.

An open data flow is a series of one or more data packets that begin with an initial data packet, such as a synchronization (SYN) message according to a protocol at layer 4 or higher, and that does not include a corresponding termination data packet, such as a finished (FIN) message, according to that protocol. In various embodiments, layer 3 source and destination addresses (e.g., source and destination IP addresses) with or without a layer 4 source or destination address (e.g., source and destination TCP ports) or other data fields in layer 3 to layer 7 headers are used to distinguish one data packet flow from another at the service gateway server.

Subscriber records 270a, 270b include subscriber ID fields 272a, 272b, respectively (collectively referenced hereinafter as subscriber ID field 272), which hold data that uniquely identifies a particular subscriber to network services on the target network, e.g., PSN 110b, who has at least one open data flow. In some embodiments, a subscriber record 270 is deleted from table 260 when the subscriber no longer maintains at least one open flow. Any identifier for a subscriber known in the art may be used as the identifier in subscriber ID field 272. For example, a subscriber identifier determined by Network Access Identifier (NAI) is used in some embodiments (see RFC2486, the entire contents of which are hereby incorporated by reference as if fully set forth herein). For example, a subscriber ID field 272a holds data that indicates "Alice@companyA.com."

Subscriber records 270a, 270b also include network address fields 274a, 274b, respectively (collectively referenced hereinafter as network address field 274), which hold data that indicates a network address for a network node (e.g., end node 120b) from which traffic originates from the particular subscriber identified in the subscriber ID field. For example, in some embodiments the network address field 274 includes a TCP port (layer 4 source), an IP address (layer 3 source), a virtual private network (VPN) identifier (layer 3 or layer 2 subset of sources), or an Ethernet virtual local area network (VLAN) tag (layer 2 subset of sources), or some combination.

Subscriber records 270a, 270b also include NAS information fields 276a, 276b, respectively (collectively referenced hereinafter as NAS information field 276), which hold data that indicates information about a particular NAS (e.g., NAS 125a) through which traffic from the particular subscriber enters the target network (e.g., PSN 110b). For example, in some embodiments the NAS information field 276 holds data that indicates an IP address of the NAS. In some embodiments the NAS information field 276 holds data that indicates an NAS identifier assigned according to NAI or some other domain name server (DNS).

Subscriber records 270a, 270b also include subscriber profile information fields 278a, 278b, respectively (collectively referenced hereinafter as subscriber profile information field 278), which hold data that indicates information about the particular user's access to the target network. For example, in some embodiments the subscriber profile information field 278 holds data that indicates policies for passing or blocking traffic from the particular subscriber, a quota of uses for the network, whether the subscriber is paid up or has pre-paid for one or more services, or some combination.

Subscriber records 270a, 270b also include list of open flows fields 280a, 280b, respectively (collectively referenced hereinafter as open flow list 274), which hold data that indicates a number of flows and for each flow a unique identifier for the data packet flow. A unique identifier for a data packet flow can be defined in any manner known in the art. In an example embodiment, the identifier for the flow is constructed from a network address for a destination of traffic from the particular user's network address as indicated by the contents of network address field 274a, described above. For example, in some embodiments the unique flow identifier for each flow in the open flows list 280 includes a TCP port (layer 4 destination), an IP address (layer 3 destinations), a virtual private network (VPN) identifier (layer 3 or layer 2 subset of destinations), or an Ethernet virtual local area network (VLAN) tag (layer 2 subset of destinations), or some combination.

According to the illustrated embodiments, subscriber records 270a, 270b also include measure of suspicious activity fields 282a, 282b, respectively (collectively referenced hereinafter as suspicious activity field 282), which hold data that indicates a measure of suspicious activity based at least in part on the data flows indicated by the open flows list 280. Any method known in the art for detecting hostile activity by a user may be used to determine the measure of suspicious activity that is stored in field 282, as described in more detail below with reference to FIG. 3. For example, in some embodiments, the measure of suspicious activity stored in field 282 is the number of open flows established over a particular time period, such as the most recent interval of time equal to the particular time period. As is described in more detail below, an excessive number of open flows established in the particular period of time is determined to be a scanning attack.

3.0 Method at Service Gateway Server

Figure 3:
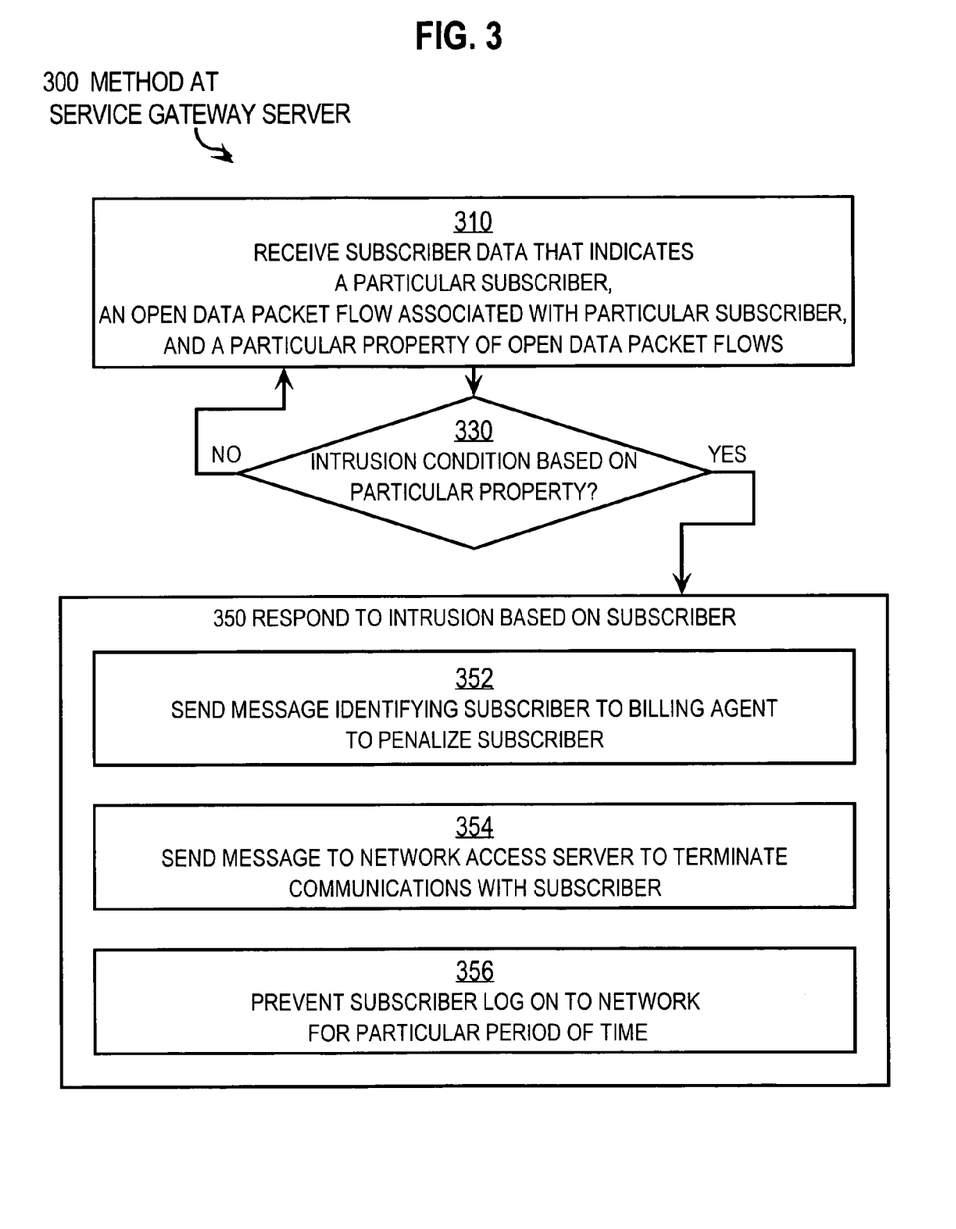
FIG. 3 is a block diagram that illustrates a method at a high level for protecting against attacks at a service gateway, according to an embodiment.

FIG. 3 is a block diagram that illustrates a method 300 at a high level for protecting against intrusions at a service gateway server. Although steps are shown in FIG. 3 and subsequent flow diagrams in a particular order for purposes of illustration, in other embodiments one or more steps are performed in a different order or overlapping in time or one or more steps are omitted or the steps are changed in some combination of ways.

In step 310, subscriber data is received. The subscriber data indicates for a particular subscriber all open data flows associated with that subscriber and a particular property of the open data flows that is a measure of suspicious activity. For example, the data for Table 260 is received during step 310. Any method known in the art to receive this information may be used. For example, the data may be received either in response to one or more queries or unsolicited from a local or remote volatile or permanent storage controlled directly by the gateway server or indirectly by one or more database or other servers.

Current service gateway servers already receive and store data for the subscriber ID field 272, the network address field 274, the NAS information field 276, the subscriber profile information field 278, and the open flows list 280. According to illustrated embodiments of the invention, data is received for the measure of suspicious activity field 282 as well.

In the illustrated embodiment, the measure of suspicious activity is the number of open flows established within the particular period of time. For example, a counter is initialized at a time a first open flow is established and incremented with each new open flow established within one second of the first flow.

In a scanning attack, a process associated with a subscriber opens many flows in a short time in order to consume resources at the service gateway server and reduce the ability of the service gateway server to process all the traffic from a particular NAS, thus denying service to one or more other subscribers. Such an attack is characterized by a large number of open flows established per second. It has been estimated that a laptop computer available at the time of this writing can generate about 200,000 SYN messages that open new data flows per second and itself launch a damaging scanning attack. Such an attack can be detected by counting the number of data flows opened per second.

Any indication of suspicious activity associated with an intrusion on network resources known in the art may be used as the measure of suspicious activity, including measures of suspicious activity used in firewall processes. In some embodiments the measure of suspicious activity is a number or a percentage of suspicious open data flows.

In some embodiments, an open data flow is considered suspicious if an initial SYN message is not followed by an acknowledgement from the targeted server in a SYN/ACK message. This is a measure of suspicious activity because, in some scanning attacks, the destination of the SYN messages is a non-existent server or random IP and port address for which there is no server to respond with a SYN/ACK message. Thus the number of open flows for which no SYN/ACK is received is a measure of suspicious activity.

In some embodiments, an open data flow is considered suspicious if an initial SYN message followed by an acknowledgement from the targeted server in a SYN/ACK message is not then followed by an acknowledgement from the subscriber in an ACK message. This is a measure of suspicious activity because, in some scanning attacks, the destination of the SYN messages is often a real server which produces a SYN/ACK message; but the attacker is interested only in establishing a new flow to consume gateway server resources and is not interested in continuing the session with the server. Thus the attacking node of the particular subscriber does not respond with an ACK message.

Other measures of suspicious activity are used in other embodiments, such as other attacks and fraud. For example, to detect the use of banned applications, a layer 7 service gateway detects the request for service from the banned application and notes it as fraud. The number of calls for the banned application in such embodiments is a measure of suspicious activity. The most egregious users would be the target of any response. In another example, total bandwidth consumed by a user during a particular time interval is a measure of suspicious activity. Generally a user subscribes to a maximum amount of bandwidth, e.g., $10^{10}$ bits (10 Gigabits) per month. Bandwidth usage above this amount is noted as fraud. With subscriber awareness, service gateway server (e.g., server 160) can count the total bandwidth used across multiple logins by the same subscriber. Such activity is not detected by a firewall.

In step 330, it is determined whether there is an intrusion condition based on the measure of suspicious activity. For example, in some embodiments, it is determined that there is an intrusion condition if the number of data flows opened per second, stored in the measure of suspicious activity field 282, exceeds 100. In some embodiments, it is determined that there is an intrusion condition if the number of suspicious open data flows, stored in the measure of suspicious activity field 282, exceeds 75. In some embodiments, it is determined that there is an intrusion condition if the number of suspicious open data flows, stored in the measure of suspicious activity field 282, divided by the number of open flows stored in the list of open flows field 280 exceeds 50%. In some embodiments, it is determined that there is an intrusion condition if the number of requests for a banned or limited application, exceeds 1. In some embodiments, it is determined that there is an intrusion condition if the bandwidth used per month exceeds $10^{10}$ Gigabits. In other embodiments, other intrusion conditions are used and tested during step 330.

If it is determined in step 330 that there is not an intrusion condition based on the measure of suspicious activity, control passes back to step 310 to continue receiving data about subscribers and their open flows or requested applications or total bandwidth, or some combination.

If it is determined in step 330 that there is an intrusion condition based on the measure of suspicious activity, control passes to step 350 to respond to the intrusion based on the particular subscriber who is associated with the measure of suspicious activity that satisfies the intrusion condition. Any response that utilizes the subscriber information may be performed. In other embodiments, any response not performed by a firewall is performed, such as a response based on any subscriber data other than the IP address of the attacker.

In the illustrated embodiment, the response includes steps 352, 354, 356. In other embodiments one or more of these steps are omitted, one or more other steps are included, or some combination of omitted and other added steps is employed.

In step 352, a message that identifies the subscriber is sent to a billing agent to penalize the subscriber. For example, a message is sent to the billing agent with a subscriber identifier based on the contents of subscriber ID field 272. The billing agent then causes the subscriber to be penalized, as described below with reference to FIG. 4. Possible penalties includes removal of authorization for the subscriber to access the network, charging the subscriber an excess fee, and sending an "out-of-band" message to the subscriber outside data network 110b. An out-of-band messages includes a text message or voice call to a cell phone or other telephone or an email to an email address or a letter by post. The out-of-band message alerts the subscriber to the intrusion and requests that the subscriber cease the intrusion. By virtue of step 352, the subscriber who launches the attack or fraud is penalized in more ways than simply dropping data packets originating from the subscriber's IP address. Thus step 552 provides superior protection than that provided by a firewall.

In step 354, a message is sent to the NAS associated with the subscriber to terminate communications with the subscriber. Any method may be used to cause the NAS to terminate communications. In an illustrated embodiment, a RADIUS Packet of Disconnect (POD) message is sent to the NAS identifying the subscriber by ID or IP address or both. The RADIUS packet of Disconnect is described in RFC 3576, the entire contents of which are hereby incorporated by reference as if fully set forth herein. According to RFC 3576, "unsolicited messages sent from the RADIUS server to the NAS [are supported]. These extended commands provide support for Disconnect and Change-of-Authorization (CoA) messages. Disconnect messages cause a user session to be terminated immediately, whereas CoA messages modify session authorization attributes such as data filters." When the NAS receives the POD, it tears down the call from the end node through the access network to the NAS, thus freeing network resources in the access network. By virtue of step 354, in communications directed to the target network, the access network upstream of the service gateway is also protected from attacks. Thus, step 354 provides superior protection than that provided by a firewall.

In step 356, the subscriber is prevented from logging on to the target network for a particular penalty period of time. In other embodiments, the subscriber is prevented from logging on to the target network indefinitely, until a network manager intervenes to restore network privileges to the subscriber. Any method may be used to prevent logging on. For example, the gateway server 160 snoops all logon messages directed to the AAA server 114 and drops those messages that indicate the subscriber associated with the suspicious activity, or sends a return message indicating logon failed. In some embodiments, a message is sent to the AAA server 114 or billing agent server 116 to remove authorization for the subscriber. In some embodiments, a message is sent to the AAA server 114 or billing agent server 116 to restore authorization for the subscriber after the penalty period expires. By virtue of step 356, the subscriber is unable to launce attacks from another device. Thus step 356 provides superior protection than that provided by a firewall.

In some embodiments, during step 356, the logon request is sent to a special repair server, which responds by notifying the subscriber of the attack or fraud launched by the subscriber's device and offers to repair the subscriber's device so that it does not launch the intrusion again. If the subscriber agrees, software is sent to be executed on the subscriber's device to find and remove the software that causes the subscriber's device to launch the intrusion. In this way an attack initiated by a virus that installed software on an unsuspecting subscriber's device, without the knowledge of the subscriber, does not cause the subscriber to be unduly penalized.

A service gateway server is a superior network node for protecting the network 100 from attacks on layer 4 through layer 7 network resources. The service gateway server (e.g., gateway 160) is the only network node in the illustrated embodiment that both tracks activity at layers 4 through layer 7 while also maintaining a mapping between a user currently assigned an IP address and a corresponding subscriber's name (e.g., a "user name"). This allows the service gateway server (e.g., gateway server 160) to generate a detailed account of the malicious activity, including network ID and user name.

4.0 Method at Billing Agent Server

Figure 4:
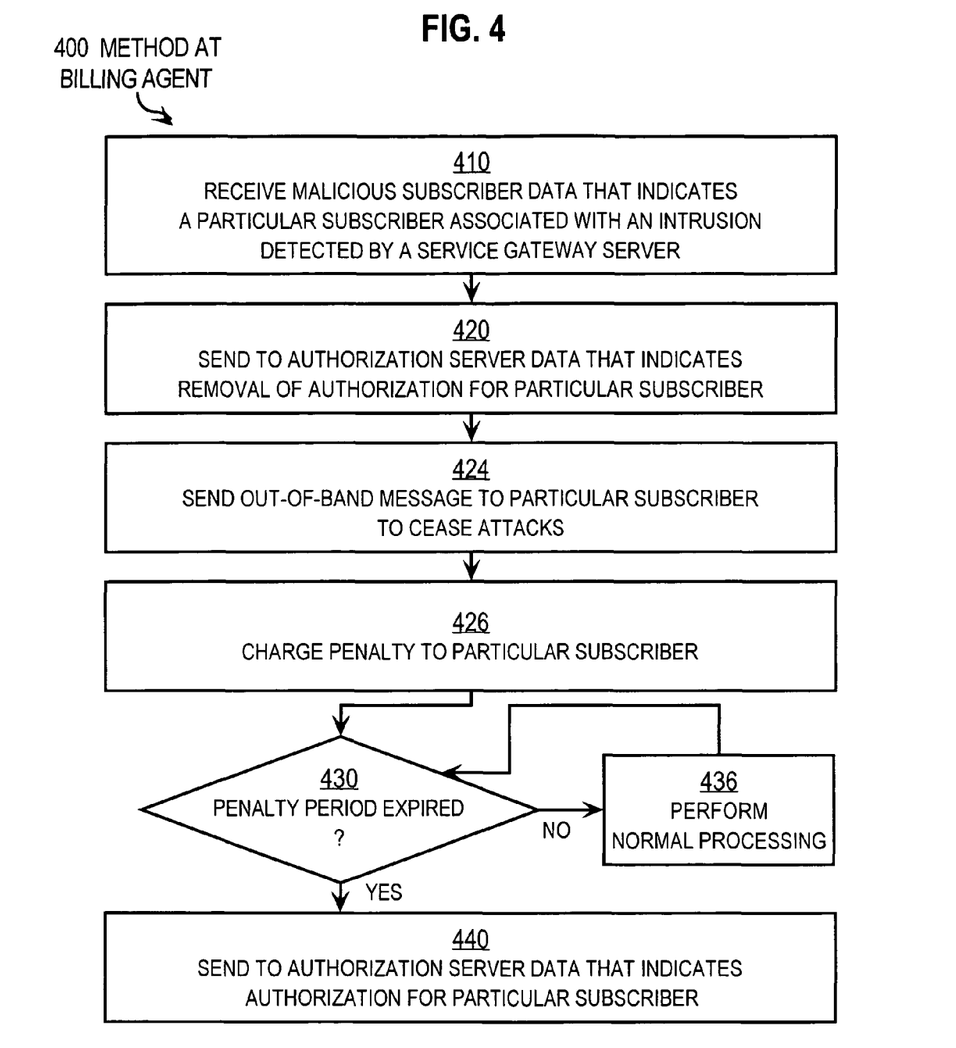
FIG. 4 is a block diagram that illustrates a method at a high level for protecting against attacks at a billing agent, according to an embodiment.

FIG. 4 is a block diagram that illustrates a method 400 at a high level for protecting against intrusions at a billing agent, according to an embodiment. In other embodiments, one or more steps of method 400 are omitted.

In step 410, malicious subscriber data is received. This data indicates a particular subscriber associated with an intrusion detected by a service gateway server. In the illustrated embodiment, the message includes data that indicates the subscriber ID (e.g., a "user name") and data that indicates that an intrusion is associated with this subscriber. In some embodiment, the data further indicates one or more specific details about the particular intrusion. In the illustrated embodiment, the data is received at billing agent 116 from the service gateway server 160 in an unsolicited message. In other embodiments, the data is received in other ways, e.g., by querying data stored locally or remotely in volatile or permanent storage accessed directly or indirectly through a database server. For example, during the course of a duty cycle or upon receipt of an alert, the billing agent retrieves data from storage that indicates the subscriber ID of a particular subscriber and an indication of an associated intrusion.

In step 420, a message is sent to the AAA server to remove the particular subscriber from the list of authorized users of the target network (e.g., PSN 110*b*). In an illustrated embodiment, the subscriber ID is included in the message to the AAA server.

In step 424, an out-of-band message is sent to the particular subscriber indicating that the subscriber should cease the attack.

In step 426, an excess cost is charged to the account of the particular subscriber as a penalty for the attack.

In step 430, it is determined whether a penalty period has expired. A penalty period is the duration of time between a time when a subscriber is removed from authorization to access the target network and a time when the subscriber is again authorized to access the target network. If it is determined that the penalty period has not expired, then control passes to step 436. In step 436, the billing agent continues with its normal processing and returns periodically to step 430 to determine if the penalty period has yet expired.

If it is determined during step 430 that the penalty period has expired, then control passes to step 440. In step 440, a message is sent to the AAA server to restore the particular subscriber to the list of authorized users of the target network (e.g., PSN 110*b*). In an illustrated embodiment, the subscriber ID is included in the message to the AAA server.

In embodiments in which the malicious subscriber is prevented from accessing the network indefinitely, steps 430 and 440 are omitted.

5.0 Implementation Mechnisms—Hardware Overview

Figure 5:
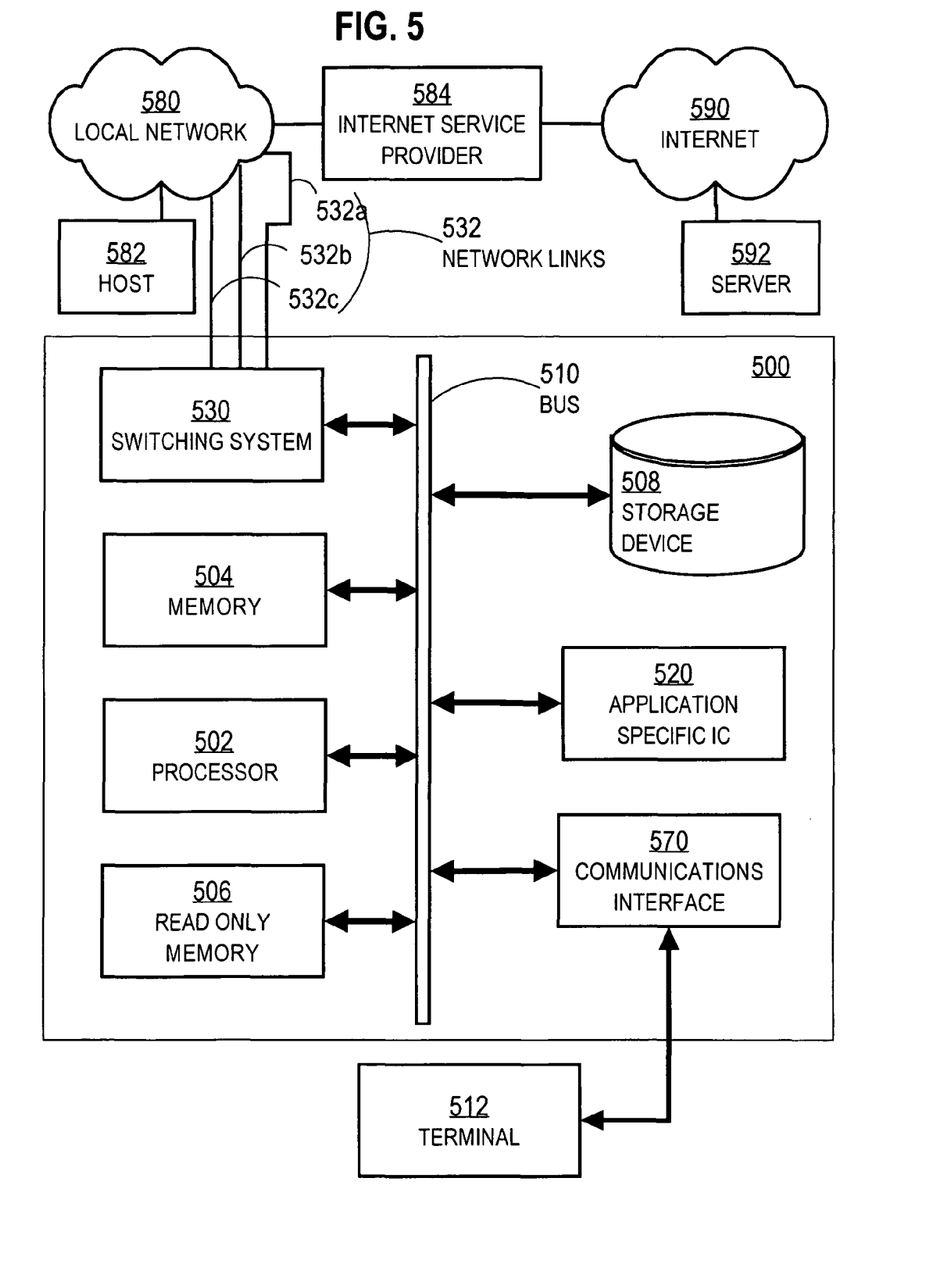
FIG. 5 is a block diagram that illustrates a computer system, such as a router, upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism, such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for protecting a packet switched network at a service gateway, comprising the steps of:
   receiving user data at a gateway server in a communication path on a packet switched network between a network access server and a content server,
   wherein the user data includes
      subscriber identifier data that indicates a unique identifier for a particular user,
      network address data that indicates a network address for a host used by the particular user,
      NAS data that indicates an identifier for the network access server,
      flow list data that indicates one or more open data packet flows, wherein an open data packet flow comprises a data packet that indicates a start of a series of data packets that pass through the gateway server for communications between the user and the content server without a corresponding termination of the series of data packets between the user and the content server, and
      suspicious activity data that indicates a value for a property of the open data packet flows that indicates suspicious activity;
   determining whether an intrusion condition is satisfied based on the suspicious activity data, wherein the intrusion condition is associated with a scanning attack, which is identified through the suspicious activity data by recognizing an excessive number of open flows being established per second such that other flows are denied access because of the excessive number of open flows; and
   if it is determined that the intrusion condition is satisfied, then responding to the intrusion by dropping packets originated from an Internet Protocol (IP) address associated with the particular end user and by sending a message to remove the particular end user's IP address from a list of authorized users for the network; and
   communicating a message based on the subscriber identifier data to a billing agent that is involved in determining charges for a particular user for causing the billing agent to penalize the particular user.

2. A method as recited in claim 1, wherein:
   the property that indicates suspicious activity is a number of the open data packet flows that are started within a particular period of time; and
   said step of determining whether an intrusion condition is satisfied comprises determining whether the number of the open data packet flows that are started within the particular period of time exceeds a threshold rate.

3. A method as recited in claim 1, wherein:
   the property that indicates suspicious activity is a number of the open data packet flows for which there is no acknowledgement message from the user; and
   said step of determining whether an intrusion condition is satisfied comprises determining whether the number of the open data packet flows for which there is no acknowledgement message from the user exceeds at least one of a threshold number and a threshold percentage of a total number of open data packet flows.

4. A method as recited in claim 1, wherein:
   the property that indicates suspicious activity is a number of the open data packet flows for which there is no acknowledgement message from the content server; and
   said step of determining whether an intrusion condition is satisfied comprises determining whether the number of the open data packet flows for which there is no acknowledgement message from the content server exceeds at least one of a threshold number and a threshold percentage of a total number of open data packet flows.

5. A method as recited in claim 1, said step of responding to the intrusion further comprising the step of sending a message to the network access server based on the NAS data to terminate communications from the particular user.

6. A method as recited in claim 5, said step of sending the message to the network access server further causing the network access server to free resources allocated to the user in an access network between the user and the network access server.

7. A method as recited in claim 6, said step of sending the message to the network access server comprising the step of sending a Remote Access Dial-in User Service (RADIUS) Packet of Disconnect (POD) to the network access server, whereby the network access server tears down a communication path in the access network and frees resources in the access network allocated to the user.

8. A method as recited in claim 1, wherein the billing agent causes a message that requests the particular user to cease undesired activity to be sent to the particular user outside the packet-switched network.

9. A method as recited in claim 1, wherein the billing agent causes the particular user to lose authorization for access to a set of one or more content servers.

10. A method as recited in claim 1, wherein the billing causes an excess fee to be charged to the particular user.

11. A method as recited in claim 1, said step of responding to the intrusion further comprising the steps of:
determining whether a logon message is received for authorization of access for the packet-switched network, which logon message includes the subscriber identifier data; and
if the logon message that includes the subscriber identifier data is received, then not granting access for the packet-switched network.

12. A method as recited in claim 11, said step of not granting access for the packet-switched network further comprising the step of not granting access for the packet-switched network during a particular penalty period of time.

13. A method as recited in claim 1, said step of responding to the intrusion further comprising the steps of:
determining whether a logon message is received for authorization of access for the packet-switched network, which logon message includes the subscriber identifier data; and
if the logon message that includes the subscriber identifier data is received, then forwarding the message to a particular server to generate a special response for the particular user.

14. A method as recited in claim 1, said step of responding to the intrusion further comprising the step of deleting all data flows associated with the same subscriber identifier.

15. The method as recited in claim 1, further comprising:
receiving, at a billing agent server, malicious subscriber data that includes subscriber identifier data that indicates a unique identifier for a particular user and intrusion data that indicates the particular user is associated with an intrusion on the target network, wherein the billing agent server is configured to respond to the malicious subscriber data by dropping packets originated from an Internet Protocol (IP) address associated with the particular end user and by sending a message to remove the particular end user's IP address from a list of authorized users for the network; and
in response to receiving the malicious subscriber data, penalizing the particular user by:
sending an out-of-band message to the particular user to warn the particular user to cease the intrusion on the target network; and
causing a penalty fee to be charged to an account associated with the particular user.

16. A method as recited in claim 15, further comprising:
determining whether a penalty period has expired; and
if it is determined that a penalty period has expired, then causing the particular user to be restored to a list of authorized users of the target network.

17. An apparatus for protecting a packet switched network at a service gateway, comprising:
means for receiving user data at a gateway server in a communication path on a packet switched network between a network access server and a content server, wherein the user data includes
subscriber identifier data that indicates a unique identifier for a particular user,
network address data that indicates a network address for a host used by the particular user,
NAS data that indicates an identifier for the network access server,
flow list data that indicates one or more open data packet flows, wherein an open data packet flow comprises a data packet that indicates a start of a series of data packets that pass through the gateway server for communications between the user and the content server without a corresponding termination of the series of data packets between the user and the content server, and
suspicious activity data that indicates a value for a property of the open data packet flows that indicates suspicious activity;
means for determining whether an intrusion condition is satisfied based on the suspicious activity data determining whether an intrusion condition is satisfied based on the suspicious activity data, wherein the intrusion condition is associated with a scanning attack, which is identified through the suspicious activity data by recognizing an excessive number of open flows being established per second such that other flows are denied access because of the excessive number of open flows; and
means for responding to the intrusion, if it is determined that the intrusion condition is satisfied, by dropping packets originated from an Internet Protocol (IP) address associated with the particular end user and by sending a message to remove the particular end user's IP address from a list of authorized users for the network;
means for receiving, at a billing agent server, malicious subscriber data that includes subscriber identifier data that indicates a unique identifier for a particular user and intrusion data that indicates the particular user is associated with an intrusion on the target network; and
means for penalizing the particular user in response to receiving the malicious subscriber data by
causing the particular user to be removed from a list of authorized users of the target network;
sending an out-of-band message to the particular user to warn the particular user to cease the intrusion on the target network; and
causing a penalty fee to be charged to an account associated with the particular user.

18. An apparatus for protecting a packet switched network at a service gateway server in a communication path on the packet switched network between a network access server and a content server on the packet switched network comprising:
a network interface that is coupled to the packet switched network for communicating therewith a data packet;
one or more processors;
a computer-readable medium; and
one or more sequences of instructions stored in the computer-readable medium, which, when executed by the one or more processors, causes the one or more processors to carry out the step of:

receiving user data that includes subscriber identifier data, network address data, NAS data, flow list data and suspicious activity data, determining whether an intrusion condition is satisfied based on the suspicious activity data;

if it is determined that the intrusion condition is satisfied, then responding to the intrusion by dropping packets originated from an Internet Protocol (IP) address associated with the particular end user and by sending a message to remove the particular end user's IP address from a list of authorized users for the network, determining whether an intrusion condition is satisfied based on the suspicious activity data, wherein the intrusion condition is associated with a scanning attack, which is identified through the suspicious activity data by recognizing an excessive number of open flows being established per second such that other flows are denied access because of the excessive number of open flows;

communicating a message based on the subscriber identifier data to a billing agent that is involved in determining charges for a particular user for causing the billing agent to penalize the particular user; and wherein the subscriber identifier data indicates a unique identifier for a particular user, the NAS data indicates an identifier for the network access server, the flow list data indicates one or more open data packet flows, wherein an open data packet flow comprises a data packet that indicates a start of a series of data packets that pass through the gateway server for communications between the user and the content server without a corresponding termination of the series of data packets between the user and the content server, and the suspicious activity data indicates a value for a property of the open data packet flows that indicates suspicious activity.

19. An apparatus as recited in claim 18, wherein:

the property that indicates suspicious activity is a number of the open data packet flows that are started within a particular period of time; and said step of determining whether an intrusion condition is satisfied comprises determining whether the number of the open data packet flows that are started within the particular period of time exceeds a threshold rate.

20. An apparatus as recited in claim 18, wherein:

the property that indicates suspicious activity is a number of the open data packet flows for which there is no acknowledgement message from the user; and said step of determining whether an intrusion condition is satisfied comprises determining whether the number of the open data packet flows for which there is no acknowledgement message from the user exceeds at least one of a threshold number and a threshold percentage of a total number of open data packet flows.

21. An apparatus as recited in claim 18, wherein:

the property that indicates suspicious activity is a number of the open data packet flows for which there is no acknowledgement message from the content server; and said step of determining whether an intrusion condition is satisfied comprises determining whether the number of the open data packet flows for which there is no acknowledgement message from the content server exceeds at least one of a threshold number and a threshold percentage of a total number of open data packet flows.

22. An apparatus as recited in claim 18, said step of responding to the intrusion further comprising the step of sending a message to the network access server based on the NAS data to terminate communications from the particular user.

23. An apparatus as recited in claim 22, said step of sending the message to the network access server further causing the network access server to free resources allocated to the user in an access network between the user and the network access server.

24. An apparatus as recited in claim 23, said step of sending the message to the network access server comprising the step of sending a Remote Access Dial-in User Service (RADIUS) Packet of Disconnect (POD) to the network access server, whereby the network access server tears down a communication path in the access network and frees resources in the access network allocated to the user.

25. An apparatus as recited in claim 18, wherein the billing agent causes a message that requests the particular user to cease undesired activity to be sent to the particular user outside the packet-switched network.

26. An apparatus as recited in claim 18, wherein the billing agent causes the particular user to lose authorization for access to a set of one or more content servers.

27. An apparatus as recited in claim 18, wherein the billing causes an excess fee to be charged to the particular user.

28. An apparatus as recited in claim 18, said step of responding to the intrusion further comprising the steps of:

determining whether a logon message is received for authorization of access for the packet-switched network, which logon message includes the subscriber identifier data; and if the logon message that includes the subscriber identifier data is received, then not granting access for the packet-switched network.

29. An apparatus as recited in claim 28, said step of not granting access for the packet-switched network further comprising the step of not granting access for the packet-switched network during a particular penalty period of time.

30. An apparatus as recited in claim 18, said step of responding to the intrusion further comprising the steps of:

determining whether a logon message is received for authorization of access for the packet-switched network, which logon message includes the subscriber identifier data; and if the logon message that includes the subscriber identifier data is received, then forwarding the message to a particular server to generate a special response for the particular user.

31. An apparatus as recited in claim 18, said step of responding to the intrusion further comprising the step of deleting all data flows associated with the same subscriber identifier.

32. An apparatus for responding to intrusions on a packet switched network at a billing agent server that provides payment information for a remote user who accesses the packet switched network, comprising:

a network interface that is coupled to the packet switched network for communicating therewith a data packet;

one or more processors, a computer-readable medium; and one or more sequences of instructions stored in the computer-readable medium, which, when executed by the one or more processors, causes the one or more processors to carry out the step of:

receiving, from a subscriber-aware service gateway server, malicious subscriber data that includes subscriber identifier data that indicates a unique identifier for a particular user and intrusion data that indicates the particular user is associated with an intrusion on the packet switched network; and in response to receiving the malicious subscriber data, penalizing the particular user by:

causing the particular user to be removed from a list of authorized users of the packet switched network;

dropping packets originated from an Internet Protocol (IP) address associated with the particular end user;

sending an out-of-band message to the particular user to warn the particular user to cease the intrusion on the packet switched network;

determining whether a penalty period has expired; and if it is determined that a penalty period has expired, then causing the particular user to be restored to a list of authorized users of the target network.

33. A non-transitory computer-readable medium carrying one or more sequences of instructions for protecting a packet switched network at a service gateway, wherein execution of the one or more sequences of instructions by one or more processors, included in a network element configured to send and to receive Internet protocol (IP) packets, causes the one or more processors to perform the steps of:

receiving user data at a gateway server in a communication path on a packet switched network between a network access server and a content server, wherein the user data includes subscriber identifier data that indicates a unique identifier for a particular user, network address data that indicates a network address for a host used by the particular user, NAS data that indicates an identifier for the network access server, flow list data that indicates one or more open data packet flows, wherein an open data packet flow comprises a data packet that indicates a start of a series of data packets that pass through the gateway server for communications between the user and the content server without a corresponding termination of the series of data packets between the user and the content server, and suspicious activity data that indicates a value for a property of the open data packet flows that indicates suspicious activity;

determining whether an intrusion condition is satisfied based on the suspicious activity data determining whether an intrusion condition is satisfied based on the suspicious activity data, wherein the intrusion condition is associated with a scanning attack, which is identified through the suspicious activity data by recognizing an excessive number of open flows being established per second such that other flows are denied access because of the excessive number of open flows; and if it is determined that the intrusion condition is satisfied, then responding to the intrusion by dropping packets originated from an Internet Protocol (IP) address associated with the particular end user and by sending a message to remove the particular end user's IP address from a list of authorized users for the network;

receiving, at a billing agent server, malicious subscriber data that includes subscriber identifier data that indicates a unique identifier for a particular user and intrusion data that indicates the particular user is associated with an intrusion on the target network; and in response to receiving the malicious subscriber data, penalizing the particular user by:

causing the particular user to be removed from a list of authorized users of the target network; and dropping packets originated from an Internet Protocol (IP) address associated with the particular end user.

34. A computer-readable medium as recited in claim 33, wherein execution of the code further causes the one or more processors to perform the steps of:

determining whether a penalty period has expired; and if it is determined that a penalty period has expired, then causing the particular user to be restored to a list of authorized users of the target network.

* * * * *